(12) United States Patent
Yates et al.

(10) Patent No.: US 9,733,739 B1
(45) Date of Patent: Aug. 15, 2017

(54) REDUCING INADVERTENT ACTIONS ON A COMPUTING DEVICE

(75) Inventors: Andrew Joseph Yates, Seattle, WA (US); Te-Lin Tuan, Seattle, WA (US); James M. Cook, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 13/609,481

(22) Filed: Sep. 11, 2012

(51) Int. Cl.
*G06F 3/041* (2006.01)

(52) U.S. Cl.
CPC ................... *G06F 3/0412* (2013.01)

(58) Field of Classification Search
CPC .............. A61M 5/007; A61M 5/16881; A61M 2005/1403; A61M 2205/3306; A61M 2205/581; A61M 2205/583; A61M 39/24; A61M 5/1408; A61M 5/14546; A61M 5/16831; A61M 5/1684; A61M 5/365; A61M 2005/1402

USPC .......................... 345/156, 173–175, 177–179
See application file for complete search history.

(56) References Cited

U.S. PATENT DOCUMENTS

2008/0288883 A1* 11/2008 Pagan ........................... 715/764
2011/0050653 A1* 3/2011 Miyazawa et al. ............ 345/179

* cited by examiner

*Primary Examiner* — Kenneth B Lee, Jr.
(74) *Attorney, Agent, or Firm* — Athorus, PLLC

(57) ABSTRACT

This application describes, in part, system and methods for reducing unintentional performance of actions, such as orders, on a computing device. In some implementations, ordering may be controlled by identifying an input within an action region and determining that the input is an intentional input before completing an order. For example, to be considered an intentional input, the input may need to remain in an action region for a predetermined time duration, or may need to move across a majority of the action region.

19 Claims, 11 Drawing Sheets

REDUCING INADVERTENT ACTIONS ON A COMPUTING DEVICE

BACKGROUND

People are increasingly interacting with computers and other electronic devices in new and interesting ways. With the increased processing capabilities and connectivity, portable devices have become widespread and many of those devices allow interaction through gesture based inputs. For example, many portable devices include touch-based displays that allow users to interact with the device, browse content and utilize applications with the touch of a finger. Rather than manipulating a cursor with a mouse or keyboard, a user can simply touch the display at a desired location and the device will respond based on the activity associated with the touched location.

While gesture based interaction with computing devices has generally made devices more usable, it has presented some undesired effects. For example, when using a touch-based device a user may inadvertently initiate an action by accidentally touching a portion of the touch-based display. In some instances, the touch-based display may not function as desired. For example, in high humidity areas, or if the user is sweaty, the increased moisture may make the touch-based display more sensitive and in some instances even receive input before the display is actually touched.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
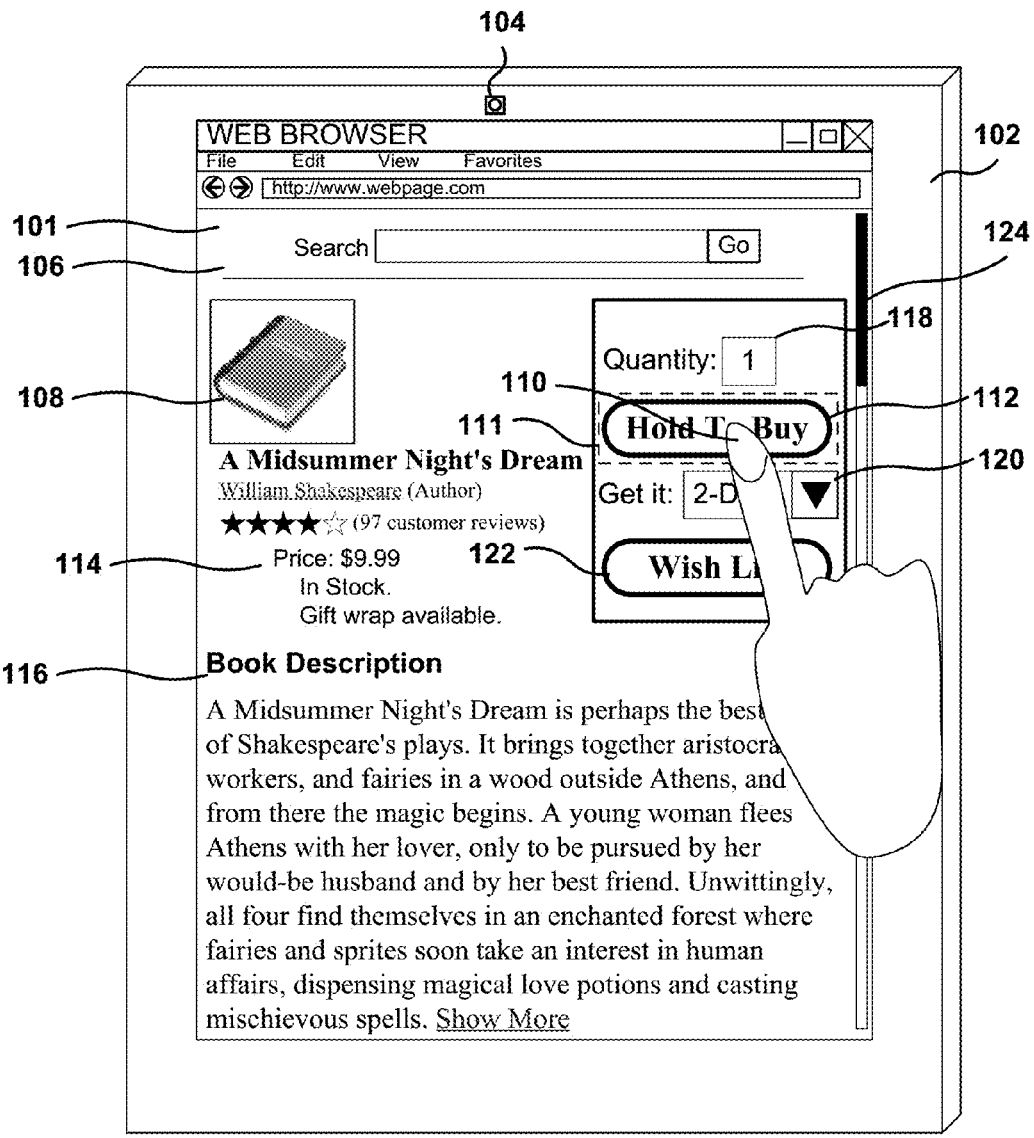
FIGS. 1-2 are block diagrams of an example user interface that utilizes an implementation for controlling gesture based orders.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes, in part, systems and methods that may be used to control ordering of an item or service via a computing device and prevent or reduce unintentional performance of certain actions. As noted above, one of the problems with some touch-based displays is the frequency with which actions are inadvertently performed. For example, mobile telephones with touch-based displays are prone to connecting a call to the last dialed number when the touch-based display comes into contact with another object (sometimes referred to as pocket dialing). In other examples, if a user is navigating an e-commerce website using a touch-based display, they may accidentally touch the order button, which may result in the unintentional ordering of the item they were viewing.

To reduce the unintentional performance of actions, some order pages or device actions may be configured to only respond to specific, intentional inputs. For example, an e-commerce website may be configured to only place an order for an item if it receives an intentional input. In some implementations, the website may be configured to only place an order when a user provides the intentional input of placing their finger on the order button graphically represented on a touch-based display for a predetermined period of time (e.g., 5 seconds) and then removing their finger from the touch-based display. In other examples, the website may be configured to only place an order when the user provides the intentional input of swiping their finger horizontally across the touch-based display over an action region.

Generally, unintentional performance of certain actions can be reduced or prevented by configuring those actions to only be performed when a specific, intentional input or series of inputs are received. An intentional input may be any input, series of inputs or type of input(s), but is generally configured to be inputs that are not typically performed in the environment. For example, if a website typically receives touch-and-release inputs (also known as tap inputs) and swipe inputs in a vertical direction (e.g., navigating up and down the website), intentional inputs that may be used to reduce inadvertent performance of certain actions may be swipe inputs in a horizontal or diagonal direction. In other examples, the intentional inputs may be a swipe input pattern in the form of a shape (e.g., circular, square, rectangle, triangle) or a swipe input around a specific portion of the website (e.g. circling the item to be purchased). In addition, or as an alternative to a swipe input as an intentional input, another intentional input for a website may be a touch-and-hold input, where the user places their finger on the touch-based display for a predetermined period of time (e.g., 3-5 seconds).

Similar to reducing unwanted orders on a website, in some implementations, other actions may be modified to only respond to intentional inputs. For example, a mobile device that includes a touch-based display may be configured to only place a call when the call button displayed on the touch-based display has received an intentional input, such as the user touching the corresponding portion of the touch-based display for a predetermined period of time.

In addition to using touch-based input components to receive intentional inputs, other forms of input components and corresponding inputs may be utilized. For example, intentional inputs may be received from a camera (facial tracking, gaze tracking, head tracking, feature tracking, expression recognition, facial recognition, light detection), accelerometer, gyroscope, inertial sensor, pressure sensor, microphone, a barometer, global positioning system (GPS), compass or any combination thereof. One or more of these input components may be included on a device or otherwise in communication with the device.

In instances where inputs other than touch-based are utilized, similar implementations may be performed. For example, if the input component is a camera and gaze tracking is used to determine where a user is looking, the intentional input may be configured such that a user must look at a specific location (e.g., the order button) for a predetermined period of time. Alternatively, the user may be required to move their gaze horizontally across an action region before an order is placed.

In some implementations, multiple intentional inputs may be required to perform certain actions. For example, in addition to touch-and-hold or swipe inputs used to place an order, some implementations may also be configured to require that the device be tilted in a downward (or any other direction) as determined by an accelerometer while the intentional touch-and-hold or swipe input is received.

While the description provided herein focuses primarily on reducing unintentional orders, the implementations described herein may be configured to reduce unintended performance of any action and the examples around ordering are provided only for explanation purposes. Likewise, while the examples herein focus on touch-based inputs received from a touch-based display, other types of inputs and/or input components may be utilized.

FIG. 1 illustrates an example portable computing device 102 that allows a user (not shown) to interact with the portable computing device 102 through touch-, gesture- and/or motion-based input(s) and submit an order request for a product or service. Although a portable computing device 102 (e.g., a smart phone, an e-book reader, or tablet computer) is shown, it should be understood that various other types of electronic devices that are capable of receiving and processing input can be used in accordance with various implementations discussed herein. These devices can include, for example, desktop computers, tablet computers, notebook computers, personal data assistants, cellular phones, video gaming consoles or controllers, and portable media players, among others.

As described in more detail below with respect to FIGS. 10-11, the portable computing device 102 may include a touch-based display 106, operable to receive touch-based user input from a user of the device, and at least one image capture element 104 (e.g., a digital still camera, video camera, optical sensor, or other such image capture element) operable to perform image capture over an associated capture range. The touch-based display 106 may provide touch in both the x-y directions as well as pressure in the z-direction. The touch based display may be resistive, capacitive, Interpolating Force-Sensitive Resistance (IFSR), or any other form of touch-based interface. Each image capture element may be, for example, a charge-coupled device (CCD) or complimentary metal-oxide semiconductor (CMOS) sensor, for example, or can utilize another appropriate image capturing technology.

In this example, the user is viewing an e-commerce website 101 using the portable computing device 102 and performing a selected motion or gesture on the touch-based display 106 using the user's fingertip 110 to provide an order request. In this example, the order request is a request to purchase the item 108 "A Midsummer Night's Dream." An order request may be a request to purchase, rent, view, download or otherwise interact with an item or service. Upon completion of an order request, the item is ordered. An item may be a digital item or a physical item. An ordered digital item may be accessible by the portable computing device 102 or by another device through which the user may interact. In some instances, the item may be downloaded and stored in memory of the portable computing device 102. Alternatively, the digital item may be stored remotely and accessible (e.g., streamed) to the portable computing device. For physical items, a user may specify a delivery or pickup location at which the user can obtain the physical items. Similarly, for services a user may specify a time, location, date, etc. for performance of the service.

Returning to FIG. 1, the user may interact with the e-commerce website 101 using the touch-based display to view information about an item 108, such as the price 114, description 116, etc. The user may also specify a quantity 118 for an order, delivery options 120 and optionally add the item to a wish list 122. Further, navigation of the e-commerce website 101 is configured such that a user may swipe their finger in a vertical direction along the touch-based display 106 to navigate up and down the website 101. For example, a user may move the graphical representation of the website 101 up or down by placing their finger 110 on the touch-based display 106 and moving their finger 110 up or down on the display 106.

Each of these interactions, specifying a quantity 124, delivery options 120, adding an item to a wish list 122 and navigating up and down the website 101 may be performed using expected inputs, such as touch-and-release or swipe in a vertical direction. These interactions, even if unintentionally performed, do not negatively impact the user or cause distrust/dissatisfaction by the user. For example, if the user accidentally touches the "Wish List" control 122, even though the item may be added to a user's wish list, there is no cost incurred by the user. In contrast, if the "Hold to Buy" control 112 is inadvertently activated and the item ordered, the user has potentially been negatively impacted. Specifically, they have inadvertently ordered an item that may cost money.

To reduce the risk of unintentional performance of certain actions available on the website 101, such as ordering the item, in one implementation one or more regions of the e-commerce website 101 may be specified to only perform an associated action when an intentional input is received. For example, the underlying code of the e-commerce website 101 may define an action region 111 that surrounds the "Hold to Buy" control 112 such that the action associated with the "Hold to Buy" control (ordering the item) is only performed when an intentional input is successfully received within the defined action region. In this example, the intentional action may be touch-and-hold on the portion of the display that corresponds to the action region 111 (user placing their finger in the action region) for a predetermined period of time (e.g., five-seconds) before the order for the item 118 is placed. The predetermined period of time may be referred to herein as an "action time." In some instances, the predetermined time may be user selectable. Likewise, in some instances, depending on the action, different order times may be specified for different actions. For example, placement of an order may have an action time of five-seconds, whereas adding an item to a wish list may have an action time of three-seconds. Different action times or different intentional inputs may be associated with different actions.

If the user keeps their finger 110 on the portion of the touch-based display 106 that corresponds with the action region 111 for the duration of the action time, the intentional input is received and the order for the item placed. If they remove their finger from the touch-based display 106 before the action time is satisfied, the intentional input is not completed and the order is not placed. Likewise, if the user moves their finger 110 outside of the area on the touch-based display 106 that corresponds with the action region 111 before completion of the action time, the intentional input is not completed and the order is not placed.

In some implementations, when the action time is satisfied and the intentional input completed, the action of ordering the item is performed and the order placed. In other implementations, a confirmation action may be performed before the intentional input is complete and the order placed. For example, once the action time is satisfied the confirmation action may be the user removing their finger from the touch-based display 106. If the user removes their finger from the touch-based display 106 the confirmation action is received, the intentional input completed and the order placed. In contrast, if the user does not perform the confirmation action, the intentional input is not completed and the order is not placed. For example, if the action time is satisfied but the user drags or swipes their finger out of the action region 111 before they remove their finger from the touch-based display, the confirmation action is not received, the intentional input is not completed and the order is not placed. In some instances, any action other than a defined confirmation action may result in the intentional input not completing and the order not being placed.

Orders for items or services may be automatically placed based on information already provided by the user to the e-commerce website 101. For example, a user may have specified in advance a delivery location (e.g., a home address) for physical items or a delivery action for digital items (e.g., download to portable computing device 102). Other information, such as credit card information, user purchase history, delivery options, etc. may also be provided and used when completing orders for an item or service.

Figure 2:
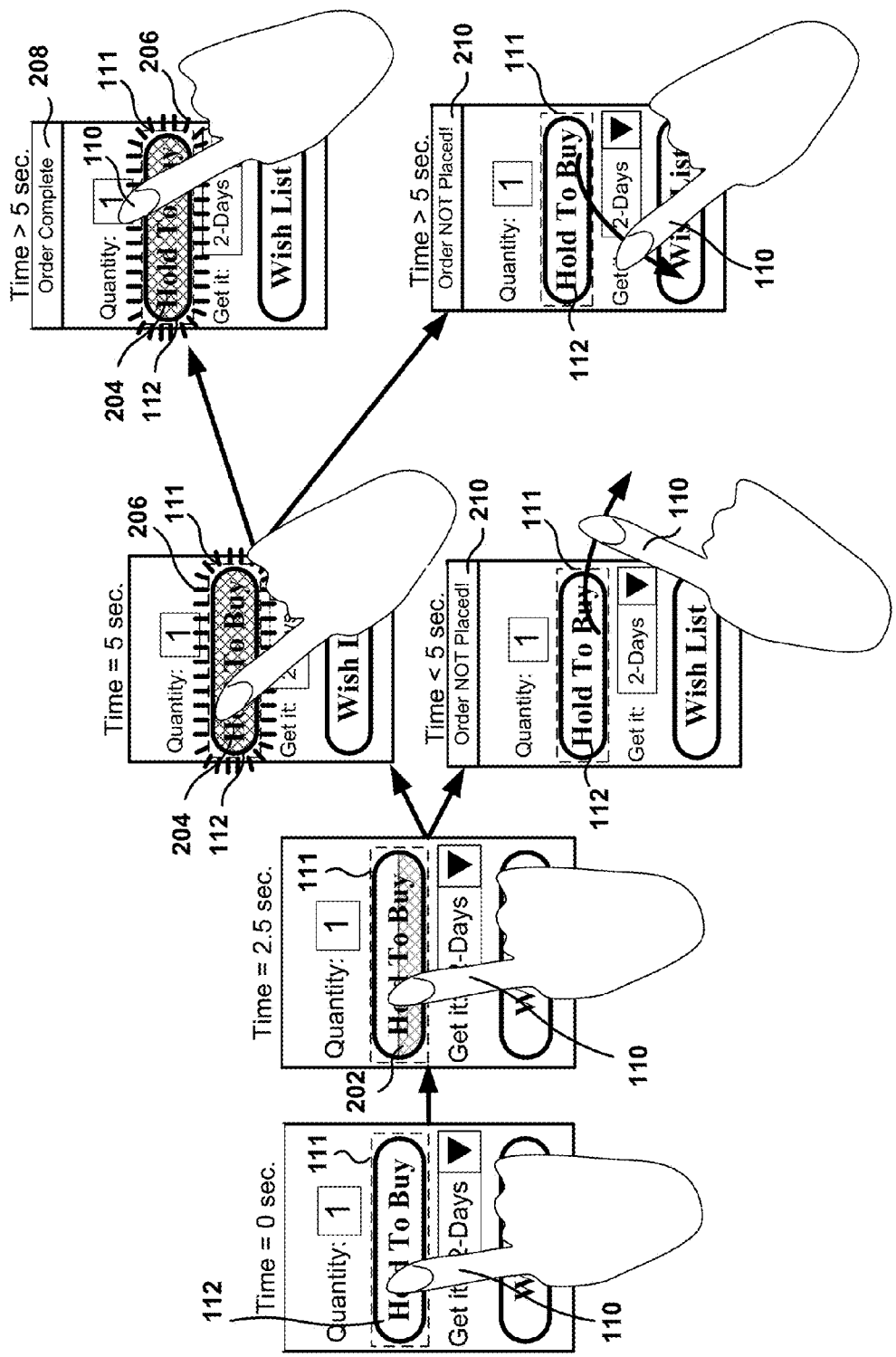

In some instances, the user may be provided visual, audible and/or tactile feedback while an intentional input is provided. FIG. 2 provides an example of the visual feedback that may be provided to a user while providing the intentional touch-and-hold input of placing their finger on a portion of the touch-based display 106 that corresponds with the action region 111. In this example, when the user initially places their finger on the portion of the touch-based display 106 associated with the action region 111, the "Hold to Buy" control 112 may be the same color as normally presented on the e-commerce website 101. In other examples, once the user's finger 110 is placed on a portion of the touch-based display 106 that corresponds with the action region 111, the "Hold to Buy" control may change colors (e.g., turn white with black letters) to indicate an initiation of an intentional input.

As the user keeps their finger positioned on a portion of the touch-based display 106 associated with the action region 111, the graphical representation of the "Hold to Buy" control 112 may change, thereby providing visual feedback to the user. For example, the graphical representation of the "Hold to Buy" control 112 may begin to partially change colors to correspond with the amount of time that has elapsed on the action time. For example, half of the "Hold to Buy" control 112 may be displayed in a different color 202 after half of the action time has been completed. In this example, the predetermined time for the action time is five-seconds. The action time begins when the user places their finger in the action region 111. After the user's finger has been placed in the action region 111 for half of the action time (2.5 seconds), the "Hold to Buy" control 112 appears to fill half way up with a different color 202 to visually represent to the user that the intentional input is being received, has not yet completed, and the order has not yet been placed.

If the user continues the intentional input by keeping their finger placed on a portion of the touch-based display 106 that corresponds to the action region 111, the visual representation may continue to update (e.g., the "Hold to Buy" control 112 continues to change colors and provides the appearance that it is filling up). If the action time has been satisfied, the user may be provided a visual indication that the action time has completed. For example, the "Hold to Buy" control 112 may appear to be full (e.g., the color has continued to change showing the entire control 112 as the same color) and/or the "Hold to Buy" control 112 may flash 206 or visually change to illustrate an action time completion. Other visual, audible and/or tactile forms of feedback may also be provided to inform the user that the action time has been satisfied. In some implementations, once the action time is satisfied the intentional input may complete and the order may be placed. In other implementations, as discussed below, a confirmation action may be needed before the intentional input is completed and the order placed.

In contrast, if the user removes their finger from the portion of the touch-based display that corresponds with the action region 111 before the action time is satisfied, the intentional input is not completed, the "Hold to Buy" control 112 may return to its normal color and the order is not placed. In addition, one or more visual, audible and/or tactile forms of feedback may also be provided to the user to inform the user that the intentional input was not successfully received and the order was not placed. For example, a text identification 210 with the words "Order NOT Placed!" may be visually presented on the touch-based display 106 if the action time is not completed before the user removes their finger from the action region. In some implementations, the user may also be provided with an audible tone indicating that the intentional input was not successfully received and the order was not placed.

In some implementations, once the action time has been satisfied (in this example, after 5 seconds have expired) a confirmation action may be needed before the intentional input is complete and the order placed. For example, once the action time has been satisfied, if the user removes their finger from the touch-based display, which may be a confirmation action, the intentional input may be satisfied and the order placed. Visual, audible and/or tactile feedback may be provided to the user to inform them that the order has been placed. For example, the "Hold to Buy" 112 control may flash 206, a text identification 208 with the words "Order Complete" may be visually presented on the touch-based display 106 and/or the portable computing device 102 may vibrate providing tactile feedback.

In implementations requiring a confirmation action, if after the action time has been satisfied the user performs any other action, such as swiping their finger 110 outside of the action region 111, the intentional input may not be completed and the order not placed. In such an instance, visual, audible and/or tactile feedback may be provided to the user confirming that the order was not placed. For example, the "Hold to Buy" control 112 may return to its normal color, a text identification 210 with the words "Order NOT Placed!" may be visually presented on the touch-based display 106 and/or an audible tone indicating that the intentional input was not successfully received and the order was not placed may be provided.

Figure 3:
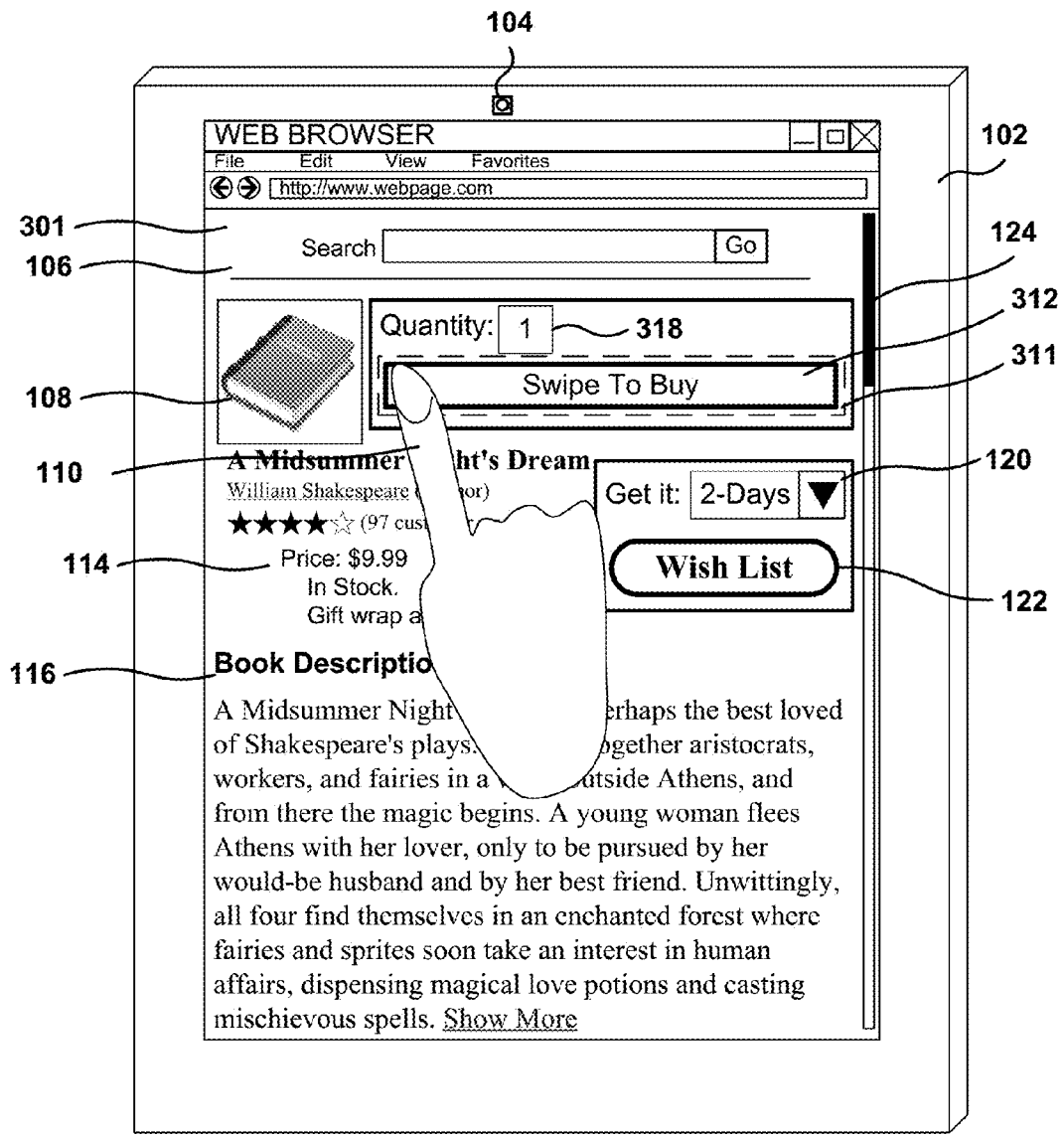
FIGS. 3-4 are block diagrams of an example user interface that utilizes another implementation for controlling gesture based orders.

FIG. 3 illustrates another example of the portable computing device 102 that allows a user (not shown) to interact with the portable computing device 102 through touch-, gesture- and/or motion-based input(s) and submit an order request for a product or service. In this example, the user is viewing an e-commerce website 301 using the portable computing device 102 and performing a selected motion or gesture on the touch-based display 106 using the user's fingertip 110 to provide an order request. In this example, the order request is a request to purchase the item 108 "A Midsummer Night's Dream."

Like FIG. 1, the user may interact with the e-commerce website 301 using the touch-based display 106 to view information about an item 108, such as the price 114, description 116, etc. The user may also specify a quantity 318 for an order, delivery options 120 and optionally add the item to a wish list 122. Further, navigation of the e-commerce website 301 is configured such that a user may swipe their finger in a vertical direction along the touch-based display 106 to navigate up and down the website 301. For example, a user may move the graphical representation of the website 301 up or down by placing their finger 110 on the touch-based display 106 and moving their finger 110 up or down on the display 106. Each of these interactions, specifying a quantity 318, delivery options 120, adding an item to a wish list 122 and navigating up and down the website 301 may be performed using expected inputs, such as touch-and-release or swipe in a vertical direction.

As an alternative to the touch-and-hold intentional input described with respect to FIGS. 1-2, this example utilizes an intentional input of swipe in the horizontal direction to reduce the risk of unintentional performance of the order action. Specifically, in this example, the e-commerce website 301 includes an action region 311 that surrounds the "Swipe to Buy" control 312 and is configured such that the action of ordering the item will only be performed when an intentional input is successfully received in the action region. In this example, the intentional input may be a swipe in the horizontal direction across the portion of the display screen that corresponds to the action region 311.

The horizontal swipe may be left-to-right or right-to-left. In some instances, the swipe must cover the entire action region. In other implementations, only a portion of the action region need be covered before the corresponding action is performed. For example, the intentional input may require that a majority of the action region be covered by the horizontal swipe before the intentional input is complete. Likewise, in some instances, the intentional input may specify that the horizontal swipe must begin and end in a single motion (i.e., be continuous). In other implementations, the intentional input may be received in segments, provided the action region if covered (or a majority covered) within a predetermined period of time.

For example, a user may begin an intentional input of a horizontal swipe across the action region 311, pause for a few seconds and then complete the intentional input by continuing the swipe across the action region 311. In some instances, the pause may be tracked by an expiration time such that if the intentional input is not completed before the expiration time is satisfied, the intentional input is not successfully received and the corresponding action is not performed.

In some instances, a predetermined time may be specified by a user for the expiration time. Likewise, different expiration times and/or different amounts of the action region that must be covered for successful completion of the intentional input may be specified for different actions. For example, placement of an order may require the entire action region be covered by a horizontal swipe that is performed in one continuous motion, whereas adding an item to a wish list may allow for up to a five-second pause during the intentional input and only require one-half of the action region be covered by the horizontal swipe. Different amounts of the action region required for an intentional input to be completed and/or different durations of the expiration time may be associated with different actions.

Returning to FIG. 3, if the user completes a horizontal swipe with their finger 110 across the portion of the touch-based display 106 that corresponds with the action region 311, the intentional input is received and the order for the item placed. If they remove their finger from the touch-based display 106 before completing the swipe across the action region 311, the intentional input is not completed and the order is not placed. Likewise, if the user moves their finger 110 outside of the area on the touch-based display 106 that corresponds with the action region 311 before completion of the horizontal swipe, the intentional input is not completed and the order is not placed.

Figure 4:
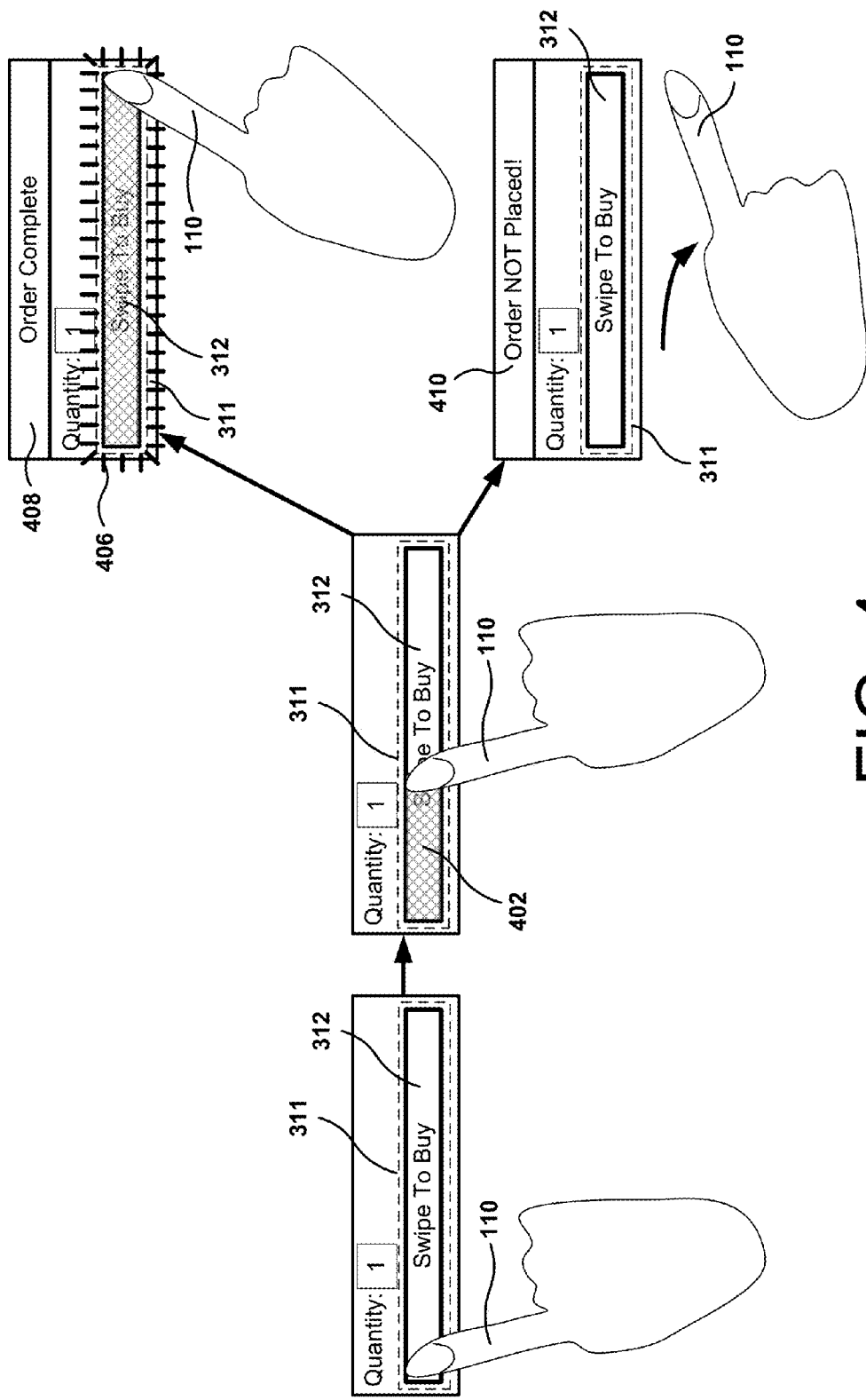

In some instances, the user may be provided visual, audible and/or tactile feedback while an intentional input is provided. FIG. 4 provides an example of the visual feedback that may be provided to a user while providing the intentional input of a horizontal swipe with their finger 110 across a portion of the touch-based display 106 that corresponds with the action region 311. In this example, when the user initially places their finger 110 on the portion of the touch-based display associated with the action region 111, the "Swipe to Buy" control 312 may be the same color as normally presented on the e-commerce website 301. In other examples, once the user's finger 110 is placed on a portion of the touch-based display 106 that corresponds with the action region 311, the "Swipe to Buy" control may change colors (e.g., turn white with black letters) to indicate an initiation of an intentional input.

As the user swipes or otherwise moves their finger across the portion of the touch-based display 106 associated with the action region 311, the graphical representation of the "Swipe to Buy" control 312 may change. For example, the graphical representation of the "Swipe to Buy" control 312 may change colors to correspond with the portion that has been covered by the movement of the input. For example, half of the "Swipe to Buy" control 312 may be displayed in a different color 402 after the user has moved the input across half of the action region 311. In some instances, when the user begins the intentional input and places their finger at one end of the action region 311 and begins a swipe pattern across the action region 311, the visual identification may be updated to correspond with the movement of the user's finger 110 across the action region 311.

If the user continues the intentional input by swiping their finger across the remaining portion of the touch-based display 106 that corresponds to the action region 311, the visual representation may continue to update (e.g., the "Swipe to Buy" control 312 continues to change colors and provides the appearance that it is being covered up by the swipe). If the expiration time is not exceeded and the specified amount of the action region is covered by the swipe input, the user may be provided with a visual indication that the intentional input has been successfully received and the order has been completed. For example, the "Swipe to Buy" control 312 may appear to be completely covered (e.g., the color has continued to change showing the entire control 312 as the same color) and/or the "Swipe to Buy" control 312 may flash 406 or visually change to illustrate a completion status. Other visual, audible and/or tactile forms of feedback may also be provided to inform the user that the intentional input has been successfully received and the corresponding action performed. For example, a text identification 408 with the words "Order Complete" may be visually presented on the touch-based display 106 and/or the portable computing device 102 may vibrate providing tactile feedback.

In contrast, if the user removes their finger from the portion of the touch-based display that corresponds with the action region 311, the intentional input is not completed, the "Swipe to Buy" control 312 may return to its normal color and the order is not placed. In addition, one or more visual, audible and/or tactile forms of feedback may also be provided to the user to inform the user that the intentional input was not successfully received and the order was not placed. For example, a text identification 410 with the words "Order NOT Placed!" may be visually presented on the touch-based display 106 if the specified amount of the action region is not covered by a swipe pattern before the user removes their finger from the action region. In some implementations, the user may also be provided with an audible tone indicating that the intentional input was not successfully received and the order was not placed.

In some instances, where an expiration time is greater than zero, the intentional input may allow for removal of the input from the action region. For example, if the expiration time is five-seconds, a user may begin an intentional input by swiping in a horizontal direction across the action region 311, pause and remove their finger from the action region 311 for two seconds, then return their finger to the action region and complete the swipe before the expiration time is exceeded. In other implementations, the expiration time may only consider the time during which the input is not received in the action region. For example, the user may be allowed to begin an intentional input and pause for any period of time provided the input (user's finger) is not removed from the input region. If the input is removed from the action region and the expiration time is set to zero the intentional input is not completed. If the expiration time is greater than zero, once the input is removed from the action region, the expiration time may begin and the user can complete the intentional input provided they return the input (e.g., the user's finger) to the action region before the expiration time expires.

Figure 5:
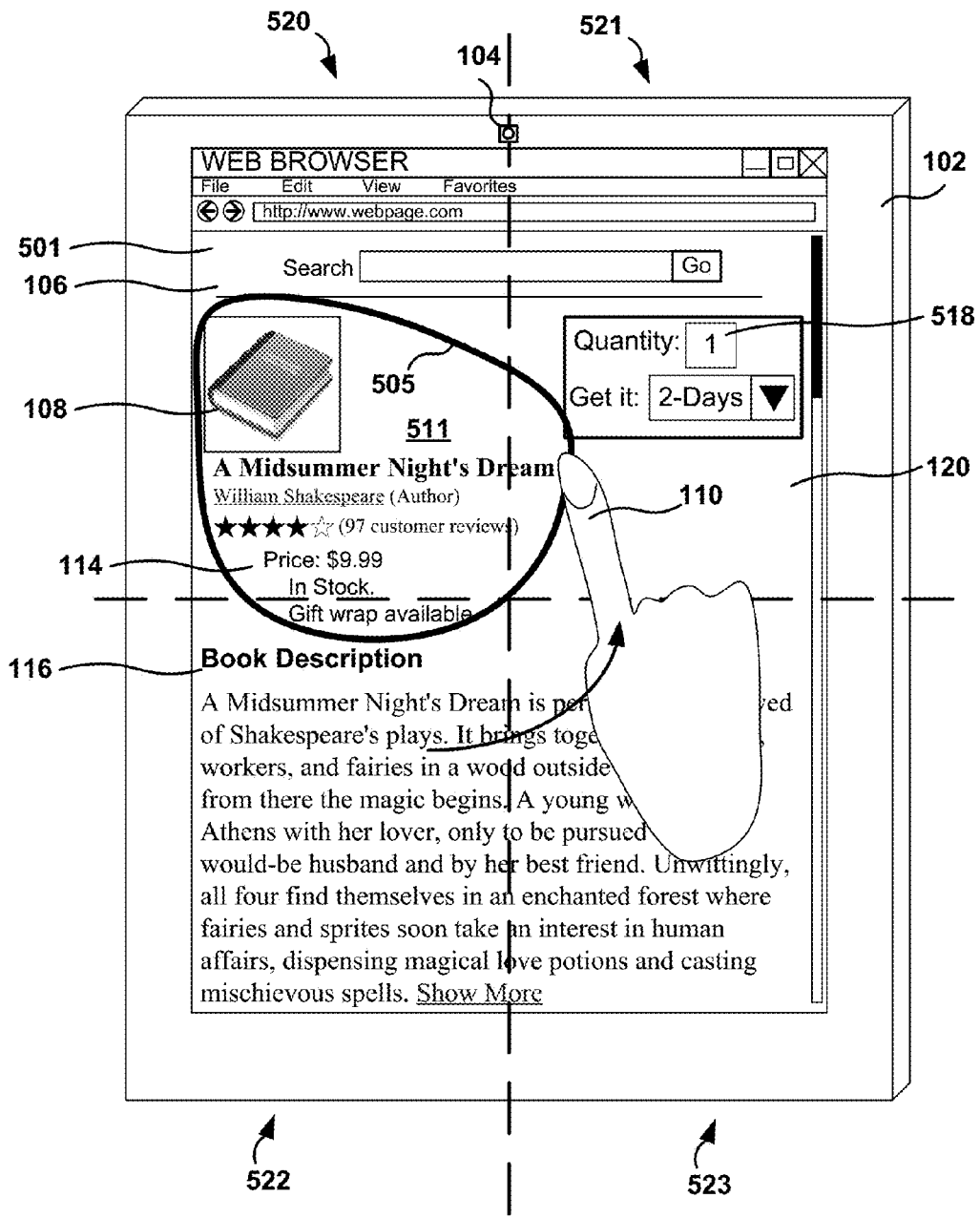
FIGS. 5-6 are block diagrams of an example user interface that utilizes another implementation for controlling gesture based orders.

FIG. 5 illustrates another example of the portable computing device 102 that allows a user (not shown) to interact with the portable computing device 102 through touch-, gesture- and/or motion-based input(s) and submit an order request for a product or service. In this example, the user is viewing an e-commerce website 501 using the portable computing device 102 and performing a selected motion or gesture on the touch-based display 106 using the user's fingertip 110 to provide an order request. In this example, the order request is a request to purchase the item 108 "A Midsummer Night's Dream."

Like FIGS. 1 and 3, the user may interact with the e-commerce website 501 using the touch-based display 106 to view information about an item 108, such as the price 114, description 116, etc. The user may also specify a quantity 518 for an order, delivery options 120 and optionally add the item to a wish list 122. Further, navigation of the e-commerce website 501 is configured such that a user may swipe their finger in a vertical direction along the touch-based display 106 to navigate up and down the website 501. For example, a user may move the graphical representation of the website 501 up or down by placing their finger 110 on the touch-based display 106 and moving their finger 110 up or down on the display 106.

Each of these interactions, specifying a quantity 518, delivery options 120, adding an item to a wish list 122 and navigating up and down the website 501 may be performed using expected inputs, such as touch-and-release or swipe in a vertical direction. As an alternative to the touch-and-hold intentional input described with respect to FIGS. 1-2 and the horizontal swipe input within a defined input region described above with respect to FIGS. 3-4, this example utilizes an intentional input of swipe pattern to reduce the risk of unintentional performance of the order action. Specifically, in this example, the e-commerce website 301 is configured to receive any intentional input swipe pattern that is not a typical input for the environment. For example, the user may perform an intentional input of providing a swipe in a circular pattern 505 around the graphical representation of the item 108 to be ordered. In this example, the action of ordering the item will only be performed when an intentional input that does not correspond to a typical input is received.

In other examples, the intentional input may be identified if it matches one of a set of potential intentional input patterns associated with the environment. The potential intentional input pattern may be, for example, any shape or other input. In some instances, the potential input pattern may be a predefined pattern (e.g., circle, square, triangle) or a user specified pattern. In addition, the website 501 may also specify specific regions where the intentional input may be received. For example, the website 501 may be segmented into two or more regions 520, 521, 522, 523 and configured to only receive an intentional input if a majority of the input is in a specified region. For example, the intentional input illustrated in FIG. 5 is received in the upper left region 520 of the displayed portion of the website. In some instances, the intentional input must cover more than one region while in other instances it may only be received if it is contained in a single region. Likewise, in some instances the potential intentional input pattern may specify that the intentional input must begin and end in a single motion (i.e., be continuous). In other implementations, a user may pause while providing the intentional input. For example, a user may begin an intentional input of a swipe pattern, pause for a few seconds and then complete the intentional input by continuing the swipe pattern. In some instances, the pause may be tracked by an expiration time in that if the intentional input is not completed before the expiration time is satisfied, the intentional input is not successfully received and the corresponding action is not performed. In some instances, a predetermined time for the expiration time may be specified by a user.

Likewise, in some instances, depending on the action, different expiration times and/or different potential intentional input patterns may be specified for different actions. For example, placement of an order may require a continual intentional input of a circular swipe pattern around the graphical representation of the item to be ordered, whereas adding an item to a wish list may allow any swipe pattern and allow up to a five second pause while the intentional input is being provided. Different intentional inputs, regions on the website 501 for receiving the intentional input and/or time during which an input may be received may be associated with different actions.

Returning to FIG. 5, if the user completes an intentional input with their finger 110 across the portion of the touch-based display 106 that corresponds with the segment 520 that will receive intentional inputs, the intentional input is received and the order for the item placed. If the user removes their finger from the touch-based display 106 before completing the intentional input, the intentional input is not completed and the order is not placed.

In some instances, the user may be provided visual, audible and/or tactile forms of feedback while an intentional input is provided. For example a graphical representation 505 of the intentional input may be displayed on the touch-based display 106 as the user provides the intentional input.

In some implementations, the intentional input described with respect to FIG. 5 may be used to define an action region for use in receiving a subsequent intentional input. For example, as the user provides an initial intentional input, such as the circular swipe pattern, once completed, the region contained by the initial intentional may be defined as an action region 511. A user may then provide a subsequent intentional input (e.g., touch-and-hold) within the defined action region 511.

Figure 6:
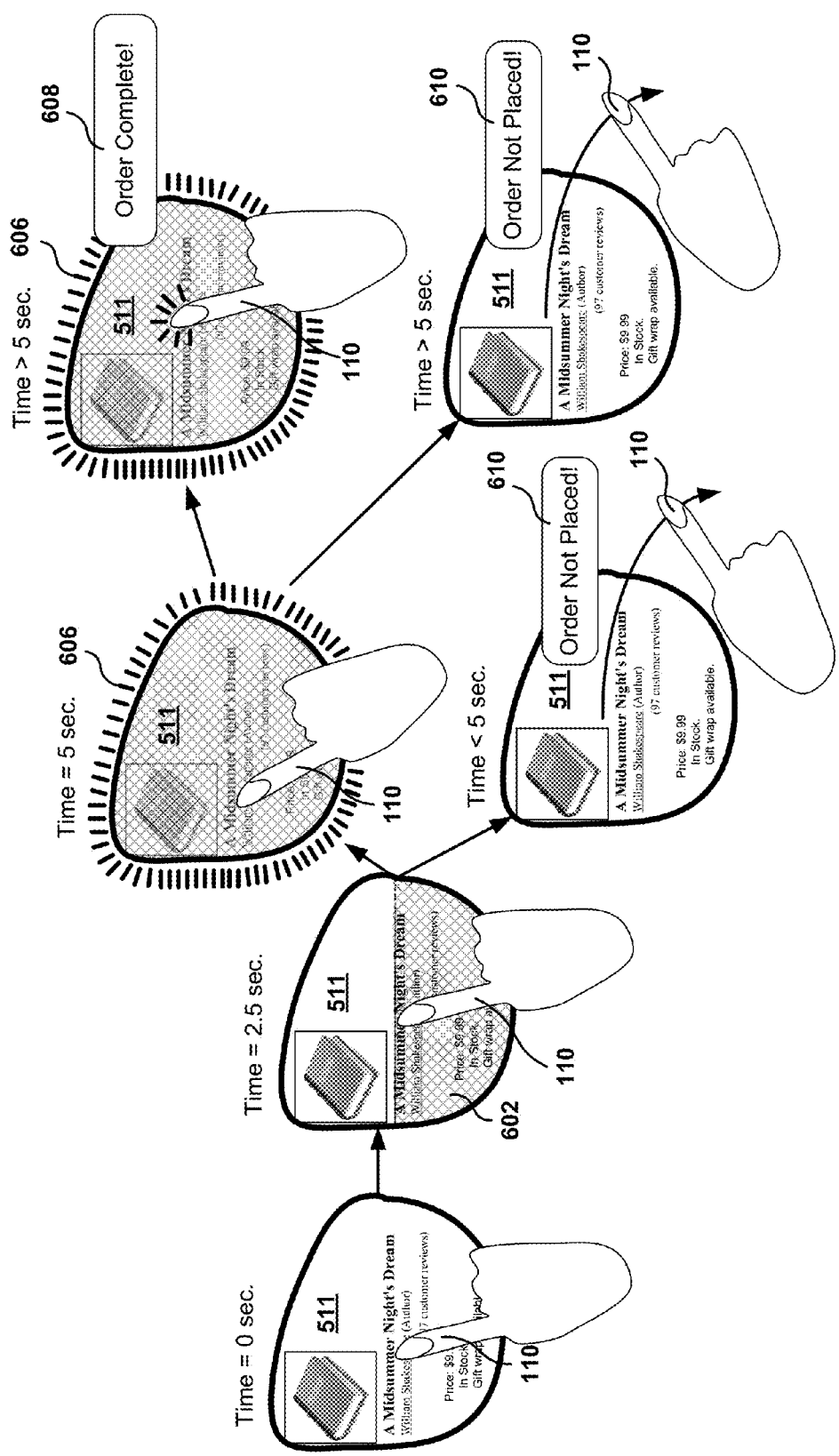

Referring to FIG. 6, an example of an action region 511 defined by the initial intentional input of a circular swipe pattern and completion of a subsequent intentional input is illustrated. In this example, visual feedback is provided to a user while providing the intentional input of touch-and-hold with their finger 110 within the action region 511 defined by the user's initial intentional input of a circular swipe pattern. In this example, once the action region 511 is defined it may be graphically represented 505 by the circular line but otherwise appear unchanged from how it is normally presented on the e-commerce website 501. In other examples, once the action region 511 is defined and the user places their finger 110 on a portion of the touch-based display 106 that corresponds with the defined action region 511, the action region 511 may change colors (e.g., turn white with black letters) to indicate an initiation of an intentional input.

As the user keeps their finger positioned on a portion of the touch-based display 106 associated with the action region 511, the graphical representation of the action region 511 may change. For example, the graphical representation of the information within the action region 511 may begin to partially change colors to correspond with the amount of time that has elapsed on the action time. For example, half of the action region 511 may be displayed in a different color 602 after half of the action time has been completed. In this example, the predetermined time for the action time is five-seconds. When the user begins the intentional input and places their finger in the action region 511, the action time begins. After the user's finger has been placed in the action region 511 for half of the action time (2.5 seconds), half of the action region 511 appears to fill half way up with a different color 502, to visually represent to the user that the intentional input is being received, has not yet completed, and the order has not yet been placed.

If the user continues the intentional input by keeping their finger placed on a portion of the touch-based display that corresponds to the action region 511, the visual representation may continue to update (e.g., the action region 511 continues to change colors and provides the appearance that it is filling up). If the action time has been satisfied and the intentional input completed, the user may be provided a visual indication that the action time has been satisfied. For example, the action region 511 may appear to be full (e.g., the color has continued to change showing the entire control 112 as the same color) and/or the action region 511 may flash 606 or visually change to illustrate a completion status. Other visual, audible and/or tactile forms of feedback may also be provided to inform the user that the action time has been satisfied. In some implementations, once the action time is satisfied the intentional input may complete and the order may be placed. In other implementations, as discussed below, a confirmation action may be needed before the intentional input is completed and the order placed.

In contrast, if the user removes their finger from the portion of the touch-based display that corresponds with the action region 511 before the action time is satisfied, the intentional input is not completed, the graphical representation of the action region 505 may be removed, the website may return to its normal appearance and the order is not placed. In addition, one or more visual, audible and/or tactile forms of feedback may also be provided to the user to inform the user that the intentional input was not successfully received and the order was not placed. For example, a text identification 610 with the words "Order NOT Placed!" may be visually presented on the touch-based display 106 if the action time is not completed before the user removes their finger from the action region 511. In some implementations, the user may also be provided an audible tone indicating that the intentional input was not successfully received and the order was not placed.

In some implementations, once the action time has been satisfied (in this example, after 5 seconds have expired) a confirmation action may be needed before the intentional input is complete and the order placed. For example, once the action time has been satisfied, if the user removes their finger from the touch-based display, which may be a confirmation action, the intentional input may be satisfied and the order placed. Visual, audible and/or tactile feedback may be provided to the user to inform them that the order has been placed. For example, the defined action region 511 may flash 606, a text identification 608 with the words "Order Complete" may be visually presented on the touch-based display 106 and/or the portable computing device 102 may vibrate providing tactile feedback.

In implementations requiring a confirmation action, if after the action time has been satisfied the user performs any other action, such as swiping their finger 110 outside of the defined action region 511, the intentional input may not be completed and the order not placed. In such an instance, visual, audible and/or tactile feedback may be provided to the user confirming that the order was not placed. For example, the defined action region 511 may return to its normal color, a text identification 210 with the words "Order NOT Placed!" may be visually presented on the touch-based display 106 and/or an audible tone indicating that the intentional input was not successfully received and the order was not placed may be provided.

Figure 7:
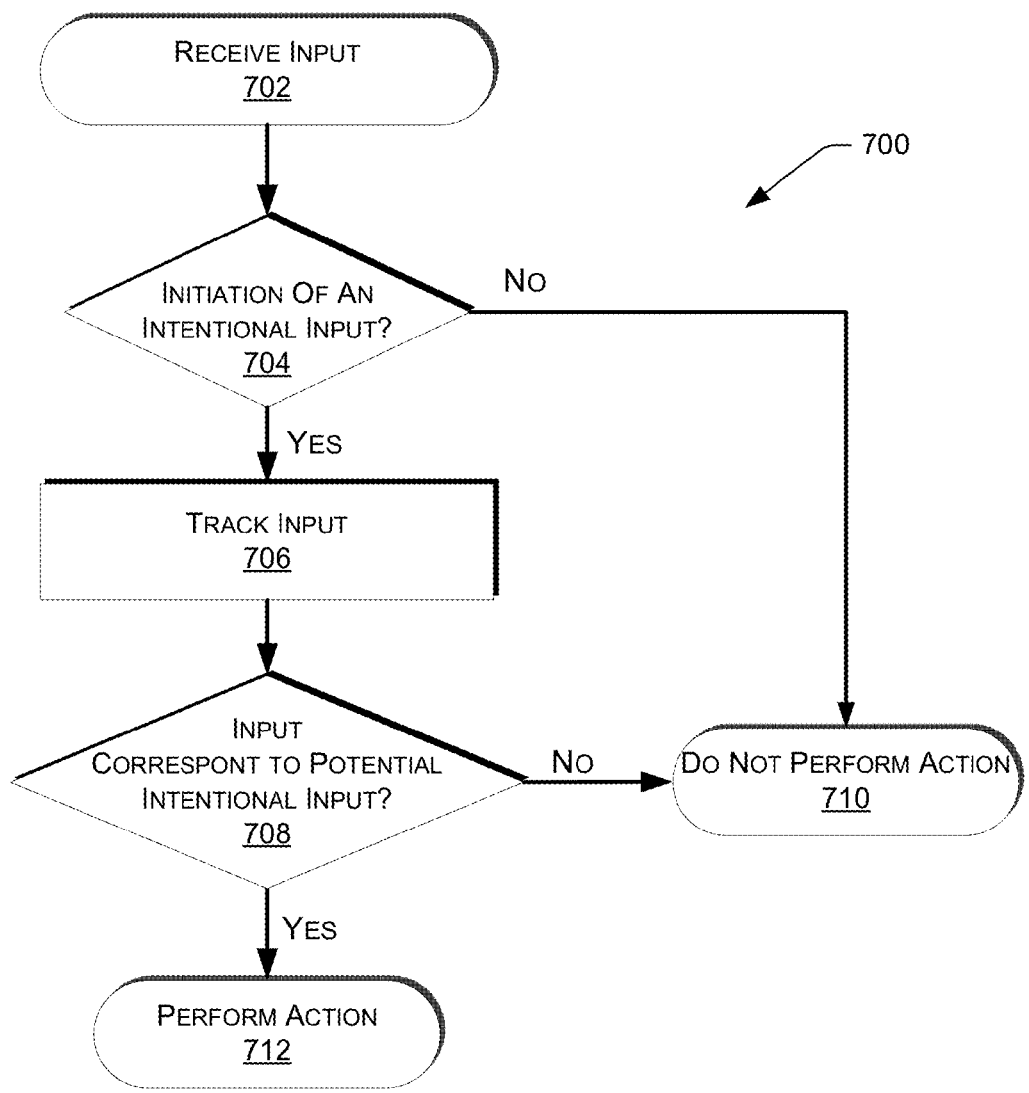
FIG. 7 illustrates an example process for reducing unintentional performance of actions on a computing device.

FIG. 7 illustrates an example process 700 for reducing unintentional performance of actions on a computing device. The example process 700, and each of the other processes described here are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 700 begins upon receipt of an input, as in 702. As discussed above, an input may be received from a variety of input components. For example, an input may be received from a touch-based display, a camera (for facial tracking, gaze tracking, head tracking, feature tracking, expression recognition, facial recognition, light detection), accelerometer, gyroscope, inertial sensor, pressure sensor, microphone, a barometer, global positioning system (GPS), compass or any combination thereof.

Upon receiving an input, a determination is made as to whether the received input is potentially the initiation of an intentional input, as in 704. In some implementations, it may be determined that a received input is potentially the initiation of an intentional input if it is an input that is non-typical for the environment. For example, if the environment is an e-commerce website, typical inputs may include touch-and-release inputs and swipe inputs in a vertical direction received via a touch-based display. Likewise, non-typical inputs may be touch-and-hold inputs or swipe inputs in the horizontal or diagonal directions. In this example, if the input is determined to be a typical input for the environment, then the input is not an initiation of an intentional input. However, if it is determined that the input is not a typical input, the received input is potentially the initiation of an intentional input.

If it is determined that the input is potentially the initiation of an intentional input, the input may be tracked, as in 706, and a determination made as to whether the tracked input corresponds to at least one of a plurality of potential intentional inputs, as in 708. Tracking of the input may be done to confirm whether a complete intentional input is received such that an associated action will be performed. For example, in some implementations there may be multiple potential intentional inputs with corresponding actions associated with the environment (e.g., an e-commerce website). If an input is determined to correspond to one of those potential intentional inputs, the associated action may be performed. Example intentional inputs may be any input that is not typical for the environment. For example, intentional inputs in an e-commerce website environment may be any non-vertical swipe pattern or a touch-and-hold input. Swipe patterns may be any shape (e.g., circle, square, rectangle, triangle, oval). Such potential intentional inputs may be associated with the environment and specific actions may be performed when received.

If it is determined that the input corresponds with at least one of the potential intentional inputs associated with the environment, a corresponding action is performed, as in 712. For example, an e-commerce environment may have an associated potential intentional input of a circle that must be received around a graphical representation of an object. When the intentional input of a circle is received around a graphical representation of an object, the corresponding action of ordering the object is performed.

However, if it is determined at decision block 704 that the received input is not potentially the initiation of intentional input, or it is determined at decision block 708 that the input does not correspond with at least one potential intentional input, no action is performed, as in 710.

Figure 8:
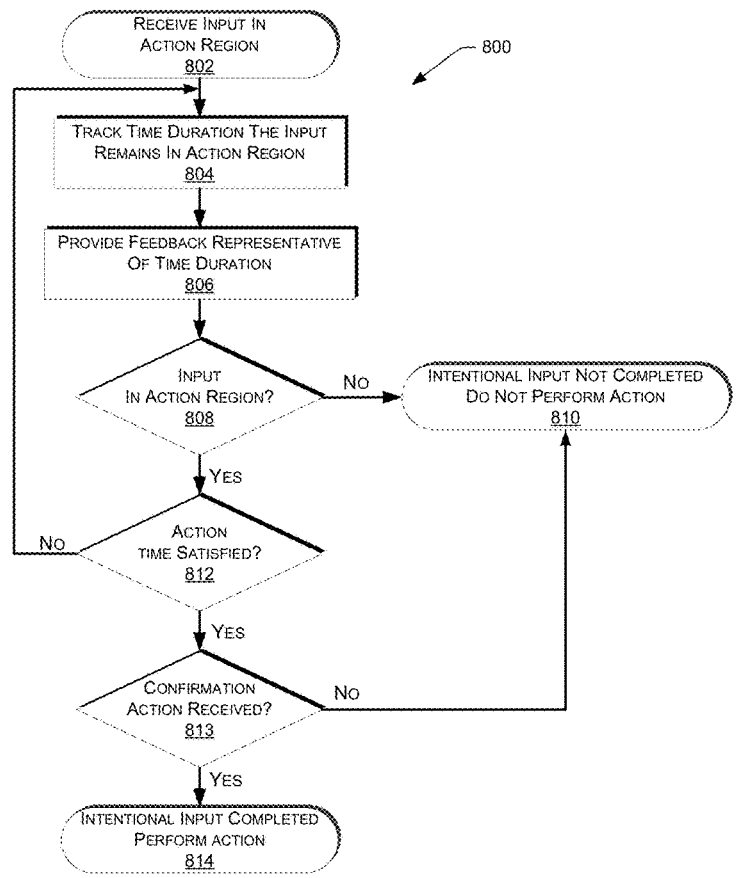
FIG. 8 illustrates another example process for reducing unintentional performance of actions on a computing device.

FIG. 8 illustrates another example process 800 for reducing unintentional performance of actions on a computing device. The example process 800 may be used to perform, for example, the implementation described above with respect FIGS. 1-2, as well as other implementations in which unintentional performance of actions is to be reduced. The example process 800 begins upon receiving an input in an action region that corresponds with a portion of an environment, as in 802. The action region may be any portion of or all of an environment, such as an e-commerce website, that is configured to receive intentional inputs.

Upon receiving an input in the action region, a time duration the input remains in the action region is tracked, as in 804. In some implementations, as the time duration is tracked, feedback may be provided to represent that the intentional input is being received but the corresponding action has not yet been performed, as in 806. Feedback may be provided in one or more of audible, visual, and/or tactile forms of output. For example, as discussed below with respect to FIG. 2, visual feedback that represents an amount of time that has elapsed since the intentional input was initiated may be provided. This visual feedback may also provide an indicator as to the amount of time remaining before the action time is satisfied and the corresponding action performed.

As the time duration is tracked and feedback provided to the user, a determination is made as to whether the input has remained within the action region, as in 808. If it is determined that the input has not remained in the action region the intentional input is not completed and the corresponding action is not performed, as in 810. However, if the input remains in the action region, a determination is made as to whether the action time has been satisfied, as in 812. If the action time has not been satisfied, the example process 800 continues tracking the time duration and providing feedback to the user, as in 804 and 806. The example process 800 may continue in this manner until either the input is no longer in the action region or the action time is satisfied.

If it is determined at decision block 812 that the action time is satisfied, it may be determined whether a confirmation action has been received, as in 813. As discussed above, a confirmation action may be any specific action performed by the user to confirm placement of the order. For example, a confirmation action may be a user removing their finger from the action region of a touch-based display after the action time has completed. If the input is provided using gaze tracking, the confirmation action may be the user blinking to confirm the order. Any specific action may be established as a confirmation action. Any other action may be treated as a non-confirmation action.

If it is determined that a confirmation action has been received, the intentional input has been completed and the corresponding action is performed, as in 814. However, if it is determined that a confirmation action has not been received, the intentional input has not completed and the action is not performed. In some instances, a confirmation time may be provided that allows a user to keep their finger on the touch-based display for a period of time after completion of the action time before the confirmation action must be received. In other implementations, the user may keep their finger (or other input) on the action region for an unlimited period of time and either the confirmation action is received, the intentional input completed and the action performed or another action is received, the intentional input not completed and the action not performed.

Figure 9:
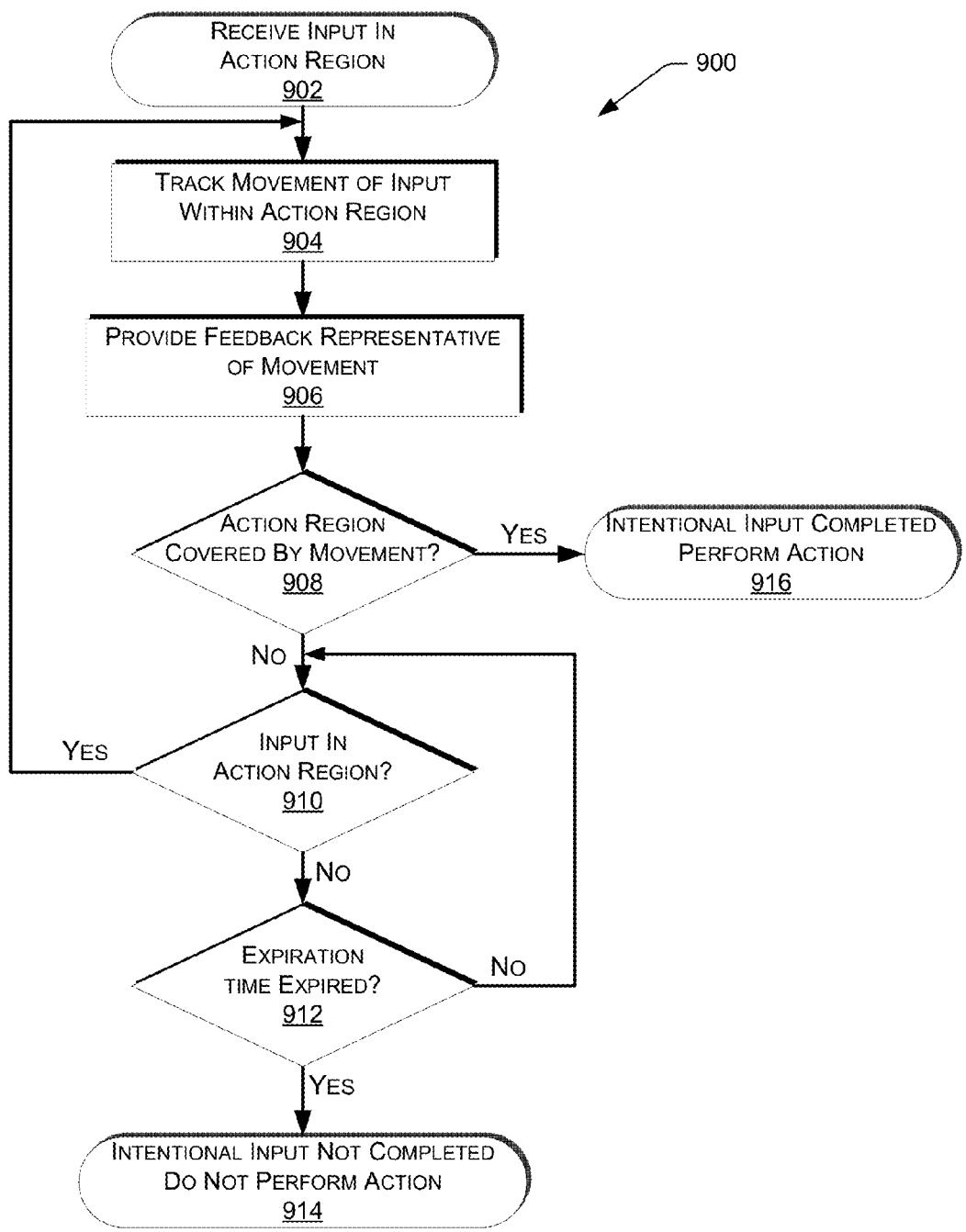
FIG. 9 illustrates another example process for reducing unintentional performance of actions on a computing device.

FIG. 9 illustrates another example process 900 for reducing unintentional performance of actions on a computing device. The example process 900 may be used to perform, for example, the implementation described above with respect FIGS. 3-4, as well as other implementations in which unintentional performance of actions is to be reduced. The example process 900 begins upon receiving an input in an action region that corresponds with a portion of an environment, as in 902. The action region may be any portion or all of an environment, such as an e-commerce website, that is configured to receive intentional inputs.

Upon receiving an input in the action region, movement of the input within the action region is tracked, as in 904. In some implementations, as the movement of the input within the action region is tracked, feedback may be provided to represent that the intentional input is being received but the corresponding action has not yet been performed, as in 906. Feedback may be provided in one or more of audible, visual, and/or tactile forms output. For example, as discussed below with respect to FIG. 4, visual feedback that represents the movement of the input within the region may be provided to illustrate the amount of the action region that has been covered by the movement. This visual feedback may also provide an indicator as to the amount of the action region that still needs to be covered before the corresponding action is performed.

As the movement is tracked and feedback provided to the user, a determination is made as to whether the movement has covered the action region, as in 908. In some implementations, all of the action region may need to be covered by the input before the intentionally input is completely received. In other implementations, only a portion (e.g., a majority) of the action region need be covered by the input.

If it is determined that the input has not covered the necessary portion of the action region, a determination may be made as to whether the input is within the action region, as in 910. In some implementations, the input may pause in one location within the action region and then continue to complete the movement covering the action region. If it is determined that the input is within the action region, the example process 900 returns to block 904 and continues.

In other implementations, it may be determined that the input has moved outside of the action region, that the intentional input is not completed and the action not performed, as in 914. In still other implementations, as illustrated by the example process 900, a portion of the intentional input may be received and then the input removed from the action region. In such an instance, it is determined at decision block 910 that the input is not within the order region and a determination is made as to whether an expiration time has expired, as in 912. An expiration time may be any period of time allowed by the example process 900 for the input to remain outside of the action region before it is determined that the intentional input has not been completely received. In some implementations, the expiration time may be set to zero, thereby requiring that the input remain in the action region for the intentional input to be completed. In other implementations, the expiration time may be greater than zero, thereby allowing the input to be removed from the action region for a period of time less than the expiration time before the intentional input is canceled and the action not performed.

If it is determined that the expiration time has not expired, the example process 900 returns to decision block 910 and continues. However, if is determined that the expiration time 912 has expired the intentional input is not completely received and the corresponding action is not performed, as in 914.

Returning to decision block 908, if it is determined that the order region has been covered by the movement of the input, the intentional input is completely received and the corresponding action is performed, as in 916.

Figure 10:
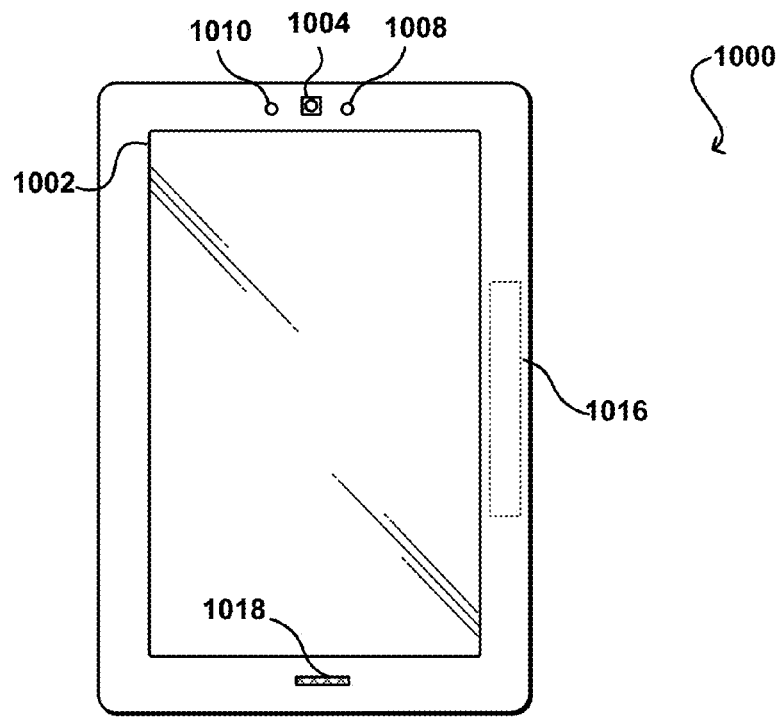
FIG. 10 illustrates an example computing device that can be used in accordance with various implementations.

FIG. 10 illustrates an example computing device 1000 that can be used in accordance with various implementations. In this example, the device has at least one input component 1004 on a same side of the device as a display 1002, enabling the computing device to capture image information for a user of the device during typical operation where the user is at least partially in front of the display 1002, and thus at least partially within the field of view of the input component. In addition, there is at least one illumination element 1008 (e.g., a white light or IR LED) positioned on the same side of the device such that an object captured by one of the cameras can be at least partially illuminated by the illumination element(s). This example device may also include a light sensor 1010 that can be used to determine an amount of light in a general direction of an image to be captured and a microphone 1018 for capturing audio information. The device also includes at least one orientation-determining component 1016, such as an accelerometer, compass, inertial sensor, or electronic gyroscope, operable to determine motion or orientation of the device. Various other input components and combinations of input components can be used as well within the scope of the various implementations as should be apparent in light of the teachings and suggestions contained herein.

Figure 11:
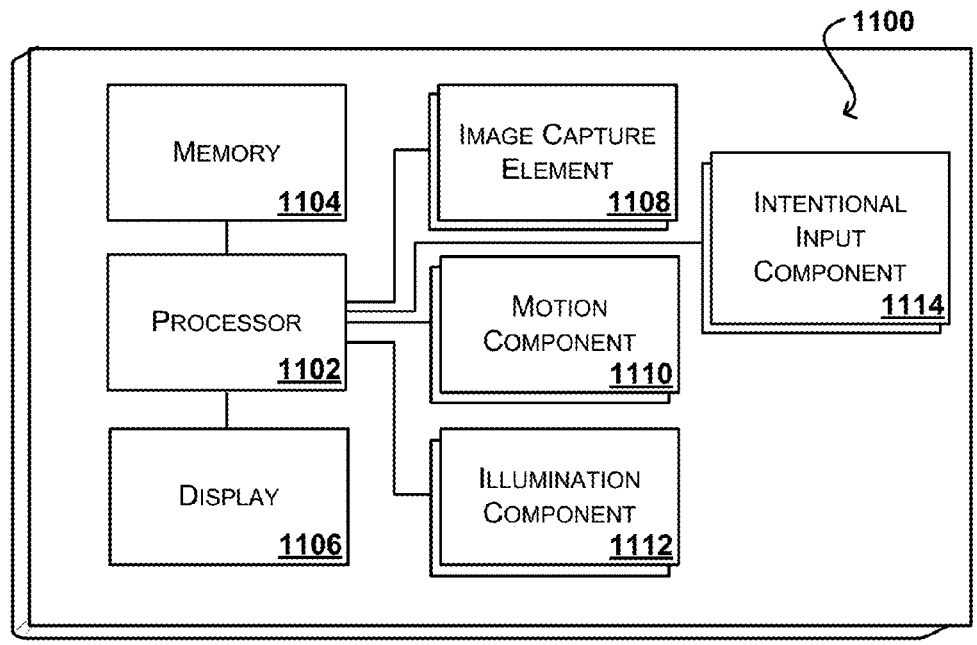
FIG. 11 illustrates an example configuration of components of a computing device such as that illustrated in FIG. 10.

In order to provide various functionality described herein, FIG. 11 illustrates an example set of basic components of a computing device 1100, such as the device 1000 described with respect to FIG. 10. In this example, the device includes at least one central processor 1102 for executing instructions that can be stored in at least one memory device or element 1104. As would be apparent to one of ordinary skill in the art, the device can include many types of memory, data storage or computer-readable storage media, such as a first data storage for program instructions for execution by the processor 1102. The same or separate storage can be used for storing environment information, intentional input patterns and/or corresponding actions to be performed. Removable storage memory can be available for sharing information with other devices, etc. The device typically will include some type of display 1106, such as a touch-based display, electronic ink (e-ink), organic light emitting diode (OLED) or liquid crystal display (LCD). In at least some implementations, the display 1106 provides for touch or swipe-based input using, for example, capacitive, resistive or IFSR touch technology.

As discussed, the device in many implementations will include at least one image capture element 1108, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can include at least one motion component 1110, such as an accelerometer, compass, inertial sensor, or electronic gyroscope, operable to detect changes in the position and/or orientation of the device. The device also can include at least one illumination element 1112, which may include one or more light sources (e.g., white light LEDs, IR emitters, or flash lamps) for providing illumination and/or one or more light sensors or detectors for detecting ambient light or intensity, etc. The device can also include at least one intentional input component 1114 that receives one or more intentional inputs from corresponding action regions, determines whether the intentional inputs are successfully received and performs or provides instructions for a corresponding action to be performed.

The example device can include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. A conventional input may also be used to provide intentional inputs. These I/O devices could be connected by a wireless, infrared, Bluetooth, or other link as well in some implementations. In some implementations, however, such a device might not include any buttons at all and might be controlled only through a combination of visual (e.g., gesture) and audio (e.g., spoken) commands such that a user can control the device without having to be in contact with the device.

Figure 12:
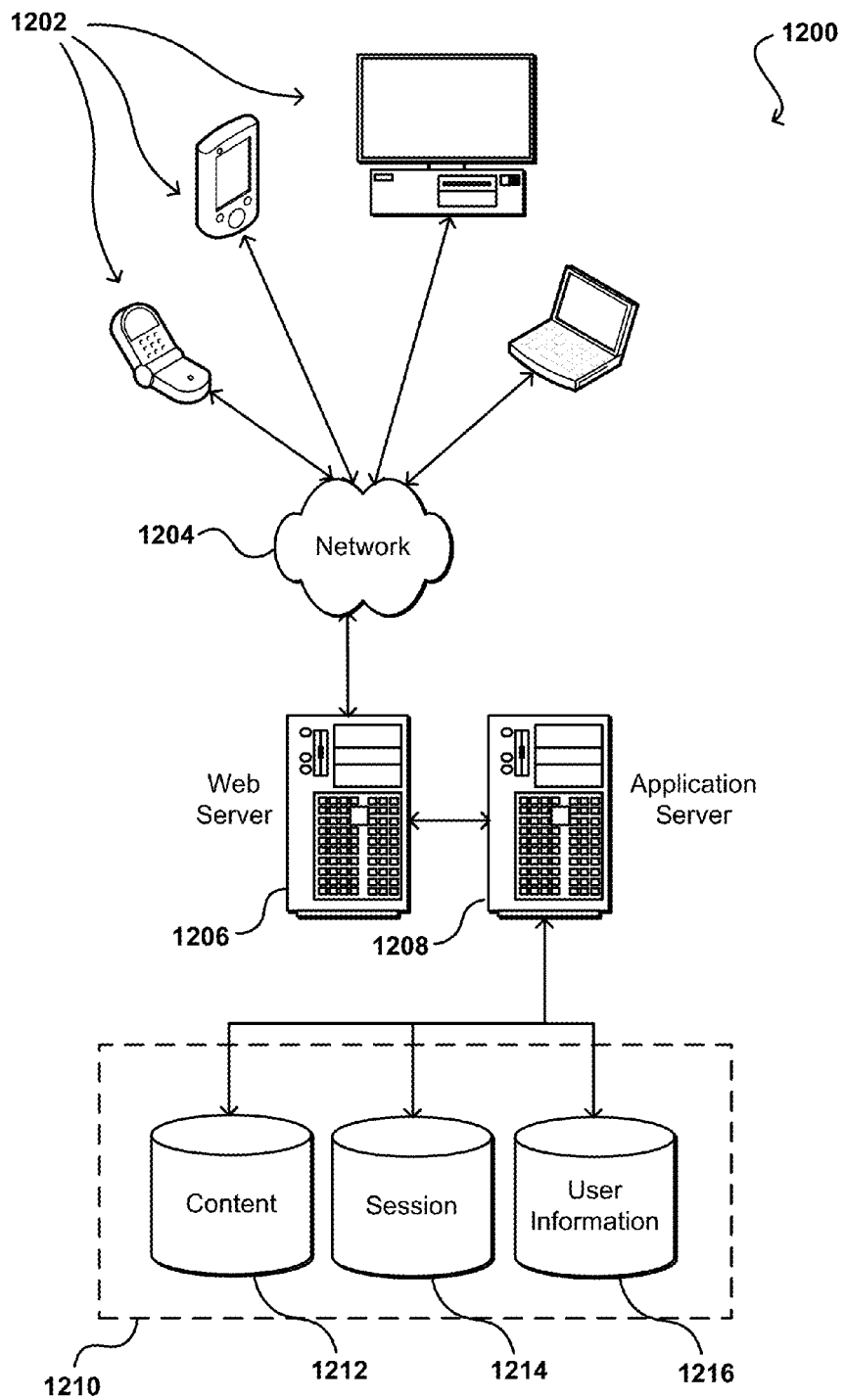
FIG. 12 illustrates an example environment in which various implementations may be performed.

As discussed, different approaches can be implemented in various environments in accordance with the described implementations. For example, FIG. 12 illustrates an example of an environment 1200 for implementing aspects in accordance with various implementations. As will be appreciated, although a Web-based environment is used for purposes of explanation, different environments may be used, as appropriate, to perform various implementations. The system includes an electronic computing device 1202, which can include any appropriate device operable to send and receive requests, messages or information over an appropriate network 1204 and convey information back to a user of the device. Examples of such client computing devices include personal computers, cell phones, handheld messaging devices, laptop computers, tablet computers, desktop computers, set-top boxes, personal data assistants, electronic book readers and the like. The network 1204 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio, video and/or identification of intentional inputs to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side and also provide intentional input information (e.g., user specified action times, intentional input patterns) and actions to be performed when an intentional input is completely received. The data store is also shown to include a mechanism for storing log or session data 1214. It should be understood that there can be many other aspects that may need to be stored in the data store, such as access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allows the server to perform its intended functions. Suitable implementations for the operating system and general functionality of the servers are known or commercially available and are readily implemented by persons having ordinary skill in the art, particularly in light of the disclosure herein.

The environment in one implementation is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various implementations can be further implemented in a wide variety of operating environments, which in some cases can include one or more user computers or computing devices which can be used to operate any number of applications. User or client computing devices can include any number of general purpose personal computers, such as desktop, tablet or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Some implementations utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network or any combination thereof.

In implementations utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of implementations, the information may reside in a storage-area network (SAN) familiar to those skilled in the art. Similarly, any necessary files, intentional input identifiers or corresponding action identifiers for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate implementations may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information. This may include computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to provide the various implementations.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
under control of one or more computing systems configured with executable instructions,
receiving an intentional input in an action region;
tracking a time duration the intentional input remains in the action region;
while the intentional input is being received in the action region, sending for display a graphical representation of the time duration;

determining that the time duration satisfies an action time; and in response to determining that the time duration satisfies the action time, completing an order associated with the action region.

2. The computer-implemented method of claim 1, wherein the graphical representation of the time duration provides an indication of an amount of the time duration that the intentional input has been received.

3. The computer-implemented method of claim 2, wherein the graphical representation of the time duration is updated to correspond with a change in the time duration.

4. A non-transitory computer-readable storage medium storing instructions to reduce unintentional performance of actions by a computing device, the instructions when executed by a processor causing the processor to at least:

track a movement of an intentional input received in an action region;

while the movement of the intentional input is being tracked in the action region, send for display a graphical representation of the movement;

determine that the movement covers at least a majority of the action region; and in response to a determination that the movement covers at least a majority of the action region, complete an order associated with the action region.

5. The non-transitory computer-readable storage medium of claim 4, wherein the intentional input is a gaze input and determined based at least in part by an image capture device.

6. The non-transitory computer-readable storage medium of claim 4, wherein the intentional input is a swipe input in a non-vertical direction across at least a portion of the action region.

7. The non-transitory computer-readable storage medium claim 4, the instructions when executed by a processor further causing the processor to at least:

send for display a confirmation that the order was completed.

8. A computing system, comprising:

one or more processors; and a memory coupled to the one or more processors and storing program instructions that when executed by the one or more processors cause the one or more processor to at least:

determine that a received input corresponds with at least one of a plurality of potential intentional inputs, wherein the received input is determined to correspond with at least one of a plurality of potential intentional inputs when the received input is a non-typical input for an environment, wherein the non-typical input is at least one of:

a swipe input in at least one of a horizontal direction or a diagonal direction; or a swipe input pattern in the form of a shape; and based at least in part on one or more of:

a movement of at least a portion of the received input; or a time duration of at least a portion of the received input; and perform an action associated with the at least one of the plurality of potential intentional inputs.

9. The computing system of claim 8, wherein the received input is determined to correspond with at least one of a plurality of potential intentional inputs based at least in part on the received input satisfying an action time, and the received input is determined to satisfy the action time when the received input remains in an action region defined for at least a portion of a website for a predetermined period of time.

10. A computing system, comprising:

one or more processors; and a memory coupled to the one or more processors and storing program instructions that when executed by the one or more processors cause the one or more processor to at least:

determine that a received input corresponds with at least one of a plurality of potential intentional inputs, wherein the received input is determined to correspond with at least one of a plurality of potential intentional inputs based at least in part on a tracking of a movement of the received input and determining that the movement covers at least a portion of an action region defined for at least a portion of a website, and based at least in part on one or more of:

a movement of at least a portion of the received input; or a time duration of at least a portion of the received input; and perform an action associated with the at least one of the plurality of potential intentional inputs.

11. The computing system of claim 8, the program instructions that when executed by the one or more processors further cause the one or more processors to define an action region based at least in part on a received first input.

12. The computing system of claim 11, wherein the received input is determined to correspond with at least one of a plurality of potential intentional inputs when at least a portion of the received input is within the action region defined based at least in part on the received first input for a predetermined time duration.

13. The computing system of claim 12, wherein the received input is determined to correspond with at least one of a plurality of potential intentional inputs when a movement of the received input covers at least a portion of the action region defined based at least in part on the received first input.

14. The computer-implemented method of claim 1, further comprising:

receiving a second intentional input, wherein:

the second intentional input is substantially concurrent with the intentional input, the second intentional input is a tilt of a device; and the tilt of the device is determined by an accelerometer of the device.

15. The non-transitory computer-readable storage medium of claim 4, wherein the instructions when executed by the processor further cause the processor to at least:

determine that the movement was completed prior to an expiration time being exceeded; and wherein the order associated with the action region is completed in response to a determination that the movement covers at least a majority of the action region and was completed prior to the expiration time.

16. A computing system, comprising:

one or more processors; and a memory coupled to the one or more processors and storing program instructions that when executed by the one or more processors cause the one or more processors to at least:

determine that a received input corresponds with at least one of a plurality of potential intentional inputs, wherein the received input is determined to correspond with at least one of a plurality of potential intentional inputs based at least in part on one or more of:
  a movement of at least a portion of the received input; or
  a time duration of at least a portion of the received input;
determine a first region of a website at which at least a majority of the received input was received;
determine that the first region is configured to receive an intentional input, wherein the web site is segmented into a plurality of regions and configured to only receive an intentional input when a majority of the intentional input is in the first region of the plurality of regions; and
perform an action associated with the intentional input.

17. The computing system of claim 8, wherein the program instructions when executed by the one or more processors further cause the one or more processors to at least:
determine a shape of the received input; and
wherein the action performed is determined based at least in part on the shape of the received input.

18. The computing system of claim 8, wherein the swipe input pattern corresponds to at least one of a plurality of predefined patterns including a circle, a square, a rectangle, a triangle, or an oval.

19. The computing system of claim 11, the program instructions that when executed by the one or more processors further cause the one or more processors to, in response to receiving the received first input, send for display a graphical representation of the action region defined to correspond to a region contained by the received first input.

* * * * *